United States Patent [19]

Schwartz et al.

[11] Patent Number: 4,742,476

[45] Date of Patent: May 3, 1988

[54] AUTOMATIC ENGINE OIL CHANGE INDICATOR SYSTEM

[75] Inventors: Ellen S. Schwartz, Warren; Donald J. Smolenski, St. Clair Shores, both of Mich.; Ann J. Wisehart, Goleta; Trieu N. Nguyen, Lompoc, both of Calif.

[73] Assignee: General Motors Corporation, Detroit, Mich.

[21] Appl. No.: 822,526

[22] Filed: Jan. 27, 1986

[51] Int. Cl.⁴ .................. F01M 11/10; G01N 25/00
[52] U.S. Cl. ................ 364/550; 123/196 S; 73/64; 340/52 F; 364/424
[58] Field of Search ................ 364/550–552, 364/424; 123/196 S, 196 R; 73/64, 117.3; 184/1.5, 6.5–6.8

[56] References Cited

U.S. PATENT DOCUMENTS 4,007,629  2/1977  Hochstein .
4,328,480  5/1982  Keitel et al. ............ 340/52 F
4,506,337  3/1985  Yasuhara .
4,629,334  12/1986  Hochstein .................. 73/64

FOREIGN PATENT DOCUMENTS 0057820  1/1982  European Pat. Off. .
0191458  8/1986  European Pat. Off. ........ 123/196 S
0030428  2/1985  Japan ..................... 123/196 S

OTHER PUBLICATIONS

"Verschleibgerechte Fahrzeugwartung" MOT, June 84.

Primary Examiner—Parshotam S. Lall
Attorney, Agent, or Firm—Mark A. Navarre

[57] ABSTRACT

A number indicative of the number of engine revolutions corresponding to the useful life of the engine oil in a motor vehicle is stored in nonvolatile memory. As the vehicle is operated, the number is periodically decremented by an amount determined in relation to a penalty factor and the number of engine revolutions which occur in the period. The penalty factor is periodically updated and is determined in relation to the operating temperature of the engine oil, based on empirically determined data. The stored number represents the remaining life of the engine oil and is continuously displayed for the information of the operator. A warning lamp is lit to alert the operator to change the oil soon when the stored number is reduced to within 10% of the originally stored value. When the oil is changed, a reset switch is actuated and the number is reset to its original value.

5 Claims, 3 Drawing Sheets

AUTOMATIC ENGINE OIL CHANGE INDICATOR SYSTEM

This invention relates to an electronic indicator system for an engine driven motor vehicle, and more particularly to a method and apparatus for providing the operator of the vehicle with information pertaining to when the engine oil should be changed.

It is well known in the motor vehicle art that engine durability is directly related to the lubricating ability of the engine crankcase oil, and that its lubricating ability becomes degraded with engine operation and time. Thus, most engine and vehicle manufacturers provide their customers with guidelines for determining when the engine oil should be changed.

By way of example, the General Motors Corporation Maintenance Schedule for gasoline fueled passenger cars and light trucks recommends that, barring severe operating conditions, the engine oil should be changed every 7,500 miles (12,000 km) or 12 months, whichever comes first. Under severe operating conditions, however, the schedule recommends that the engine oil be changed every 3,000 miles (4,800 km) or 3 months, whichever comes first. In this regard, severe operating conditions are defined as including trips less than 4 miles (6.4 km) in below freezing weather, extended idling, trailer towing, operating in dusty areas, and extended stop-and-go driving.

Those skilled in the art recognize that oil change maintenance schedules of the type set forth above are only guidelines, and that depending on the engine operating conditions, the required oil change interval may be as short as 1,700 miles (2,720 km) or as long as 10,000 miles (16,000 km). Accordingly, it has been proposed to provide an estimate of the required oil change interval for a given vehicle by electronically monitoring certain key engine operating parameters in the course of vehicle operation between oil changes. When it is determined that an oil change is required, the operator is so informed by an instrument panel indicator. In one system, for example, the actual mileage of the vehicle is multiplied by a factor, the value of which is varied according to the operating speed of the engine, and an engine load indication (such as coolant temperature) to arrive at a calculated mileage. When the calculated mileage exceeds a threshold, an indicator is tripped to inform the operator that an oil change is required.

Our research in this area has shown that a more direct indication of the oil degradation, and therefore the need for an oil change, can be determined by monitoring the temperature of the oil, without regard to engine loading or operating conditions which are indirectly related to oil temperature variations. Excessive degradation of the engine oil occurs at its temperature extremes. At high oil temperatures, antioxidants in the oil tend to become depleted, and the oil becomes more viscous and acidic due to oxidation and nitration. In addition, insoluble particles are deposited on the engine surfaces as a varnish or sludge. At low oil temperatures, fuel, water and soot tend to accumulate in the oil, reducing its viscosity and increasing wear. In addition, acids produced by incomplete combustion reduce the ability of the oil to prevent rust and corrosion.

The indicator system of this invention can be mechanized with a computerized engine or other system control unit to provide a reliable indication of required oil change based on empirical data and measured values of oil temperature and engine speed. The number of engine revolutions corresponding to the maximum engine oil life which would occur if the vehicle were continuously operated under conditions least degrading to the lubricating ability of the oil is stored in a nonvolatile memory location in the control unit. In each period of vehicle operation, the number is decremented in accordance with an effective engine revolutions value determined in relation to the product of measured engine revolutions and an engine oil temperature dependent penalty factor (FACTOR). When the oil temperature is in an intermediate ideal range, the penalty factor is set equal to one (1), and the effective engine revolutions value accumulates at the measured rate. When the oil temperature is outside the ideal range, the penalty factor is set to a value greater than one (1) in accordance with a predetermined schedule so that the effective engine revolutions value accumulates at a rate which is faster than the measured rate. The stored number represents the remaining life of the engine oil, and is displayed for the information of the operator. A warning indication is given when the stored number is decremented below 10% of its original value. In parallel operation, a time clock is reset at each oil change, and the control unit operates to actuate the warning indication at the expiration of a 12-month interval if the stored number has not yet been decremented to zero.

It will be recognized, of course, that this invention may be implemented in terms of vehicle mileage as opposed to engine revolutions. In such case, the maximum oil change interval is stored in terms of miles, and the effective mileage is computed according to the product of the miles accumulated at a given oil temperature and the corresponding oil temperature dependent factor. While a mileage based system is briefly discussed herein, the preferred and illustrated embodiment is in the form of an engine revolutions based system as described above.

IN THE DRAWINGS

Figure 1:
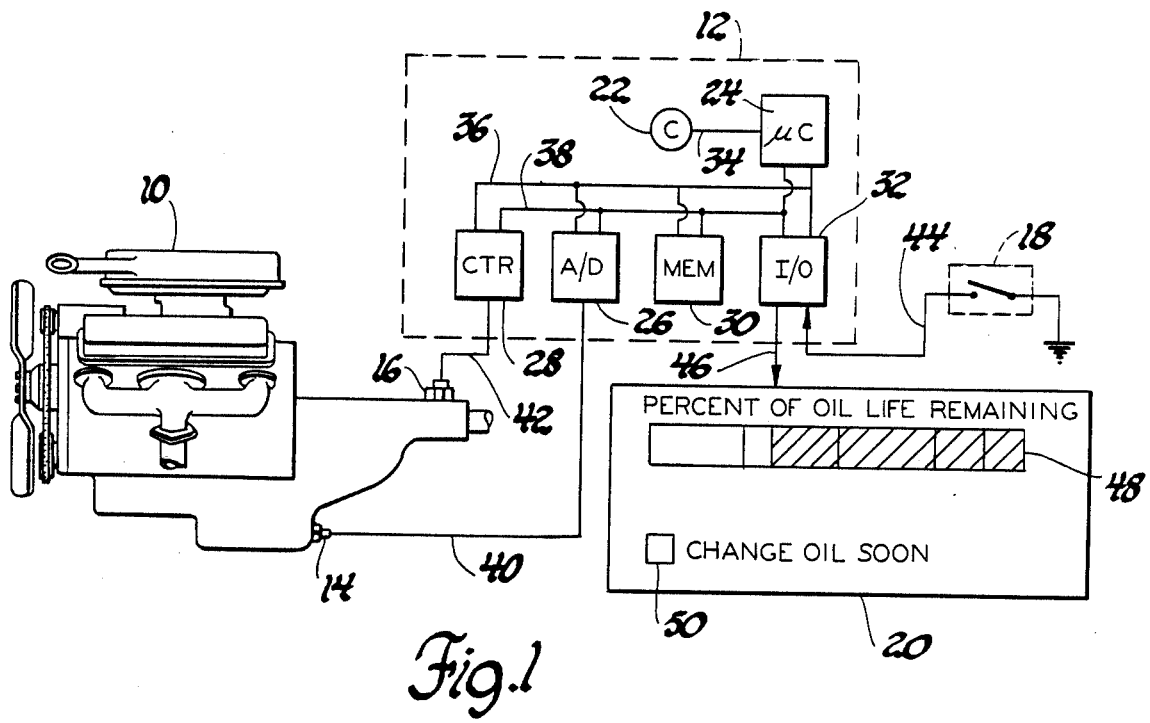
FIG. 1 is a schematic diagram of a computerized control unit and indicator for mechanizing the oil change indicator system of this invention.

Referring now to the drawings, FIG. 1 schematically depicts an oil change indicator system according to this invention with a conventional motor vehicle engine 10. The oil change indicator system comprises a computerized control unit 12, an oil temperature sensor 14, an engine speed sensor 16, an oil change reset switch 18, and an instrument panel display unit 20. Essentially, inputs from the sensors 14 and 16 and from the oil change reset switch 18 are applied to control unit 12, which in turn generates a suitable operator readout on the display unit 20.

The control unit 12 includes conventional computer control elements, including a Clock 22, a Microcomputer 24, an Analog-to-Digital Converter (A/D) 26, a Counter (CTR) 28, a nonvolatile Memory 30, and an Input/Output device (I/O) 32. The Clock 22 provides high frequency pulses to Microcomputer 24 via line 34, and the elements 24-32 communicate with each other via an Address and Control Bus 36 and a bi-directional Data Bus 38. The analog output of oil temperature sensor 14 on line 40 is applied as an input to A/D 26 where it is converted to a digital format and made available for acquisition via Data Bus 38. The digital pulse train output of engine speed sensor 16 on line 42 is applied as an input to Counter 28 where it is divided down to a rate of one pulse per engine revolution and made available for acquisition via Data Bus 38. The digital output of oil change reset switch 18 on line 44 is applied as an input to I/O device 32, and the digital information for controlling the operation of display unit 20 is outputted from I/O device 32 via line 46.

The sensors 14 and 16 may be conventional temperature and speed transducers. Thus, the temperature sensor 14 may be a varistor element housed in a conductive probe positioned in the mainstream of oil flow or in any location where the measured oil temperature is representative of the temperature of the oil in the mainstream of oil flow; and the speed sensor 16 may be a variable reluctance magnetic pickup cooperating with a toothed ferromagnetic wheel coupled to the engine crankshaft. More detailed specifications of such sensors are readily available to those skilled in the art and therefore are not supplied herein. The oil change reset switch 18 may be a conventional momentary contact single-pole-single-throw switch as shown.

The display unit 20 includes a bar-type continuous readout 48, a lamp 50, and drivers for the same. The readout 48 continuously indicates the percent of oil life remaining, and the lamp 50 indicates required action by the operator of the vehicle. In particular, the lamp 50 is lit when the remaining oil life falls below 10%, and indicates that the operator should "change oil soon". It will be recognized that other types of displays may also be appropriate, such as a numerical indication of the number of miles (kilometers) to next oil change.

Figure 2:
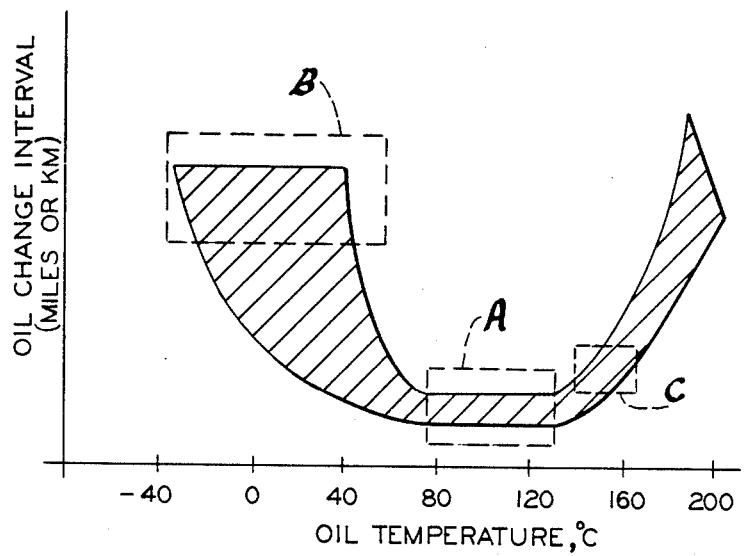
FIG. 2 is a graphical representation of data relating required oil change interval to oil temperature in motor vehicles.

FIG. 2 is a graphical representation of an extensive body of data relating recommended oil change interval to oil temperature. The criteria for determining the necessity of an oil change included limiting thresholds based on fuel dilution, acidity/basicity, soot accumulation, oxidation induction time, viscosity increase, and a Coordinating Research Council (CRC) rust rating. As soon as one limiting value was exceeded, it was considered that the oil should be changed. The body of data included within the box A represents ideal operating service for oil life, as would occur in long trips during moderate ambient temperatures. Under such conditions, very little damage occurs to an engine, and the oil change interval may be as high as 10,000 miles (16,000 km). The body of data included within the box B represents cold temperature, short trip service, where the average trip length is approximately 2.5 miles (4.0 km). Under such conditions, fuel dilution and engine wear become significant problems, and the oil change interval is reduced to approximately 1,500-2,300 miles (2,400-3,680 km), depending on the oil temperature. The body of data included within the box C represents high temperature operation due to extended idling, heavy engine loading, etc. Under such conditions, oil oxidation and thickening become significant problems, and the oil change interval is reduced to 3,000-5,000 miles (5,000-8,000 km). Data falling between the boxes A and B, and beyond the box C tends to follow a parabolic pattern, as shown.

Figure 3:
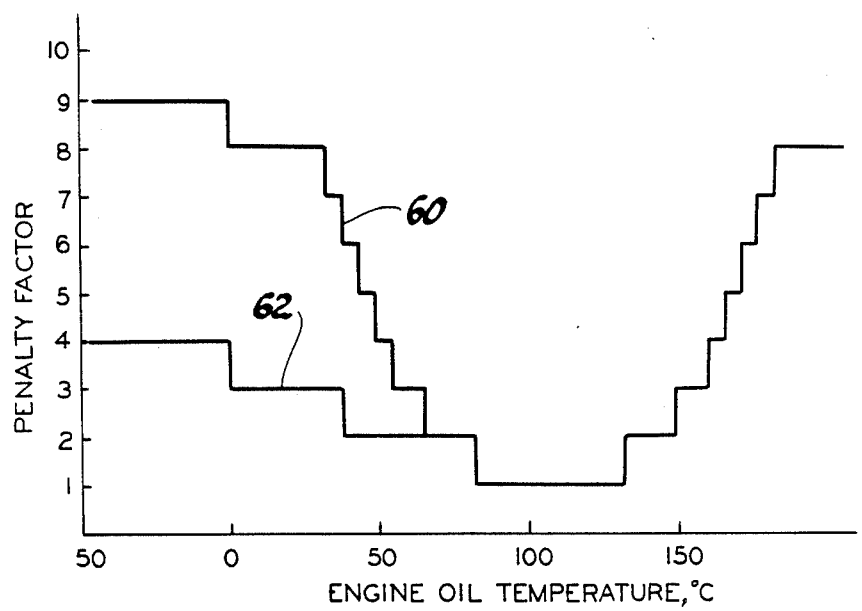
FIG. 3 is a graphical representation of the relationship between measured oil temperature and penalty factor value according the this invention.

FIG. 3 graphically depicts the assignment of penalty factors as a function of oil temperature on both a mileage basis and an engine revolutions basis. The mileage based penalty factors are designated by the trace 60 and the engine revolutions based penalty factors are designated by the trace 62. In both cases, the factors are based on the data presented in FIG. 2, and are determined without regard to engine load, per se.

The mileage based penalty factors designated by the trace 60 generally correspond to the worst case, or uppermost boundary trace of the data depicted in FIG. 2. The assigned penalty factors are proportional to the reciprocal of the mileage at oil change. Since extended periods of engine idling are not accounted for in a mileage based system, a separate routine is required to identify such operation and compensate therefor.

The engine revolution based penalty factors designated by the trace 62 deviate somewhat from the mileage based penalty factors due to differences between accumulated revolutions and accumulated mileage at lower oil temperatures. More specifically, the occurrence of low oil temperature indicates that the engine has just recently been started. Under such conditions, engine revolutions tend to accumulate faster than vehicle miles because of extended idling or low speed operation, higher engine idling speeds, and operation in lower transmission speed ratios. Such differences require a lowering of the penalty factors for low oil temperature operation as compared to a mileage based system, based on statistical correlation of vehicle data. At higher oil temperatures, engine revolution and vehicle mileage accumulations tend to even out since the transmission is most likely operating in a single, high speed ratio. As indicated above, the engine revolution based system is considered to be preferred since no routine for sensing extended engine idling is required.

Figure 4:
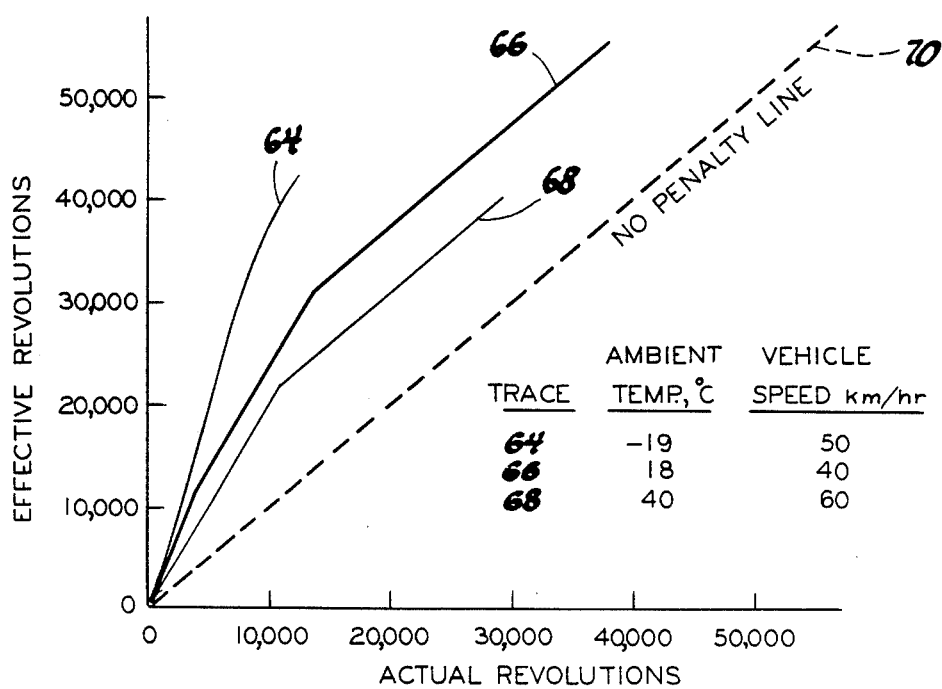
FIG. 4 is a graph depicting the accumulation of effective engine revolutions for three different periods of vehicle operation, using the indicator system of this invention as illustrated herein.

FIG. 4 graphically represents the accumulation of effective engine revolutions as compared with actual engine revolutions in a test vehicle using the penalty factor values depicted by the trace 62 in FIG. 3. The trace 64 represents a test trip at a speed of 50 km/hr under an ambient temperature of −19 degrees C.; the trace 66 represents a test trip at a speed of 40 km/hr under an ambient temperature of +18 degrees C.; and the trace 68 represents a test trip at a speed of 60 km/hr under an ambient temperature of +40 degrees C. Changes in the slope of the traces signify step changes in the penalty factor due to increases in the sensed oil temperature. In each case, the oil was at the ambient temperature when the engine was started and the vehicles were accelerated to the specified speed shortly thereafter. A trip under ideal engine oil temperatures—that is, a penalty factor of one—is represented by the broken trace 70.

Figure 5:
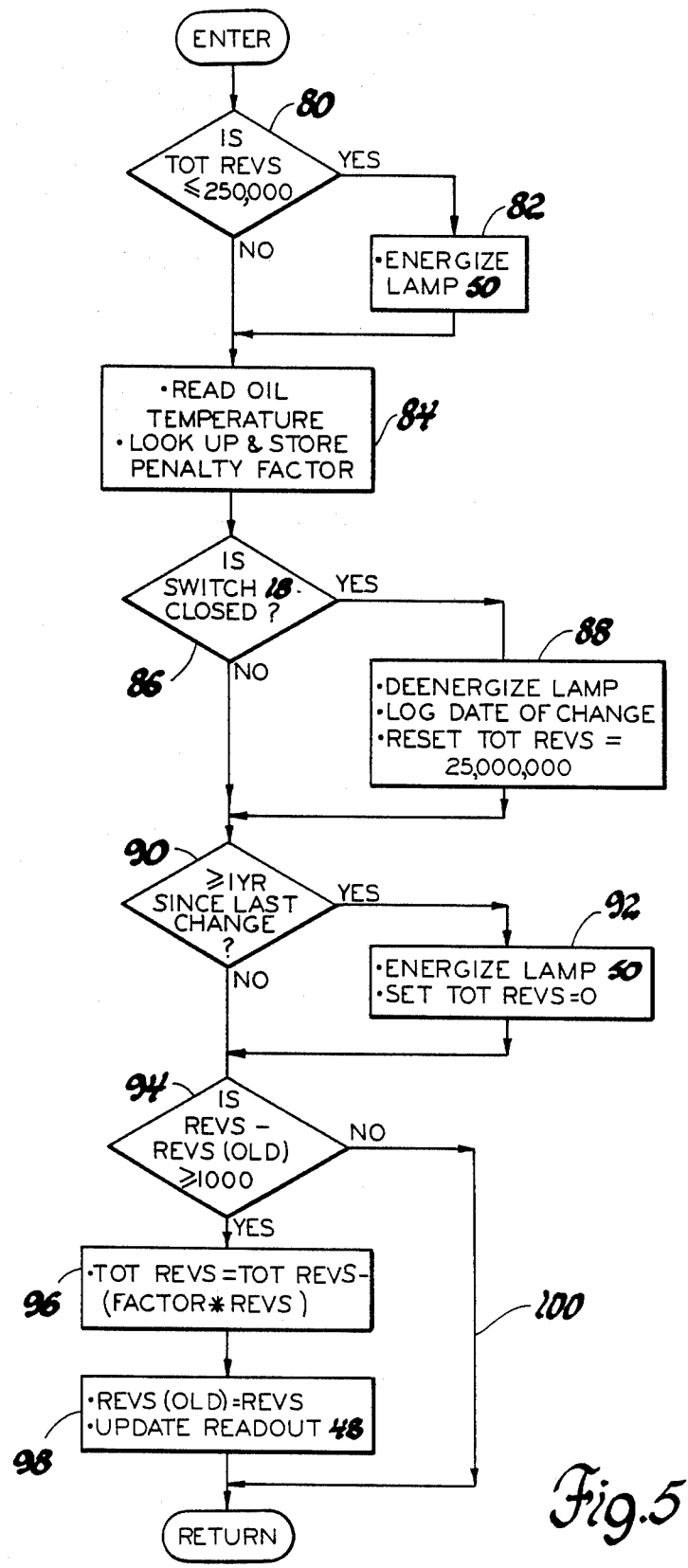
FIG. 5 depicts a flow diagram representative of computer program instructions to be executed by the control system computer of FIG. 1 for carrying out the control functions of this invention.

FIG. 5 depicts a flow diagram representative of program instructions executed by the Microcomputer 24 of FIG. 1 for carrying out the control functions of this invention. Since the controller will likely perform other functions in addition to the control functions of this invention, the flow diagram is depicted as a subroutine which is periodically called from a main program. In a particular motor vehicle installation of this invention, the engine oil was found to have a maximum useful life of 25,000,000 engine revolutions, which corresponds to 12,000 miles (19,200 km). In more general terms, we have found that the maximum useful life in engine revolutions, MAXREV, can be related to driven miles according to the expression:

$$MAXREV = k \times (N_e/N_v) \times 720,000$$

where k is a constant approximately equal to one (1) depending on the vehicle, and $(N_e/N_v)$ is the ratio of engine speed to vehicle speed when the vehicle transmission is in high gear and the torque converter, if any, is prevented from slipping. In such expression, the number 720,000 derives from the product of maximum driven miles (12,000) and the conversion term of 60 min/hr.

On entering the flow diagram, the decision block 80 is executed to determine if a term indicative of the total remaining engine revolutions, TOT REVS, has been decremented below 250,000—that is, to less than 10% of its assumed useful life. If so, the instruction block 82 is executed to energize the lamp 50 to indicate that the engine oil should be changed. Then the instruction block 84 is executed to read the oil temperature, and to determine a temperature dependent penalty factor from a look-up table containing the information graphically represented by the trace 62 of FIG. 3. The decision block 86 is then executed to determine if the oil change reset switch 18 has been closed, indicating that the oil has been changed. If so, the instruction block 88 is executed to deenergize the lamp 50 (if energized), to log the date of the oil change, and to reset the term TOT REVS to the assumed useful life of 25,000,000 revolutions. Then the decision block 90 is executed to determine if one year or more has elapsed since the date logged at the last closure of the oil change reset switch 18. If so, the instruction block 92 is executed to energize the lamp 50 for indicating that the oil should be changed, and to set the term TOT REVS equal to zero. Then the decision block 94 is executed to determine if the count, REVS, in Counter 28 (or similar counter which accumulates engine revolutions) exceeds a prior count, REVS(OLD), by more than 1000. If so, the instruction blocks 96 and 98 are executed to decrement the term TOT REVS by the product (FACTOR * REVS), to set the term REVS(OLD) equal to REVS, and to update the readout 48. If decision block 94 is answered in the negative, the execution of instruction blocks 96 and 98 is skipped, as indicated by the flow diagram line 100.

As set forth above, the preferred embodiment of this invention is mechanized by storing a number indicative of the maximum useful life of the engine oil in nonvolatile memory, and periodically decrementing the number by an amount determined in relation to the current penalty factor and the number of engine revolutions which define the period. The stored number, and thus the remaining oil life, is continuously displayed on the readout 48 or other suitable display. The lamp 50 is lit to warn the operator to change the oil soon when the stored number is reduced to within 10% of its assumed maximum value. The penalty factor is determined solely in accordance with the sensed temperature of the engine oil as it relates to the oil degradation criteria described above in reference to FIG. 2, and not in accordance with the engine load, per se. When the engine oil is changed and the reset switch 18 actuated, the stored number is reset to the assumed maximum value.

While this invention has been described in reference to the illustrated embodiment, various modifications thereto will occur to those skilled in the art. For example, the oil temperature may be calculated from other measurements in an engine, and these calculated oil temperatures may be used in place of measured oil temperatures. In this regard, it will be understood that systems incorporating such modifications may fall within the scope of this invention, which is defined by the appended claims.

What is claimed is:

1. In a motor vehicle having an engine containing lubricating oil which has a useful life that varies in accordance with engine operating conditions, a method for advising the operator of the vehicle of the need to change the oil, such method comprising the steps of:
   periodically computing an effective usage amount in relation to a measure of the actual engine usage and a penalty factor which operates to increase the effective usage amount when the engine operating conditions tend to cause increased degradation of the engine oil, the penalty factor being determined as a sole function of the engine oil temperature as it relates to empirically determined data without regard to the engine load; and
   accumulating said periodically computed effective usage amounts, and actuating an indicator for advising the operator that the engine oil should be changed when such accumulated usage amount reaches a predetermined value indicative that the useful life of the engine oil has been substantially attained.

2. The method set forth in claim 1, wherein the engine oil temperature dependent penalty factors are determined in relation to empirically derived data relating driven distance to a predefined degradation of the engine oil.

3. In a motor vehicle having an engine containing lubricating oil which has a useful life that varies in accordance with engine operating conditions, a method for advising the operator of the vehicle of the need to change the oil, such method comprising the steps of:
   periodically computing an effective usage amount in relation to the product of actual engine revolutions and a penalty factor which operates to increase the effective usage amount when the engine operating conditions tend to cause increased degradation of the engine oil, the penalty factor being determined as a sole function of the engine oil temperature as it relates to empirically determined data without regard to the engine load; and
   accumulating said periodically computed effective usage amounts, and actuating an indicator for advising the operator that the engine oil should be changed when such accumulated usage amount reaches a predetermined value indicative that the useful life of the engine oil has been substantially attained.

4. The method set forth in claim 3, wherein the penalty factors are based on empirically derived data relating driven distance to a predefined degradation of the engine oil, and then adjusted to account for differences between the driven distance and the corresponding number of engine revolutions.

5. The method set forth in claim 4, wherein the adjustment of the driven distance based penalty factors for differences between driven distance and the corresponding number of engine revolutions entails a lowering of the penalty factors associated with relatively low engine oil temperature, thereby to account for operating conditions experienced shortly after the initiation of a period of engine operation during which the number of engine revolutions occurring in a given driven distance significantly exceeds the number of revolutions occurring as the temperature of the engine oil approaches its steady state operating value.

* * * * *